J. C. BIELA.
FREIGHT CAR CONSTRUCTION.
APPLICATION FILED FEB. 2, 1917.
1,238,874.
Patented Sept. 4, 1917.
2 SHEETS—SHEET 1.
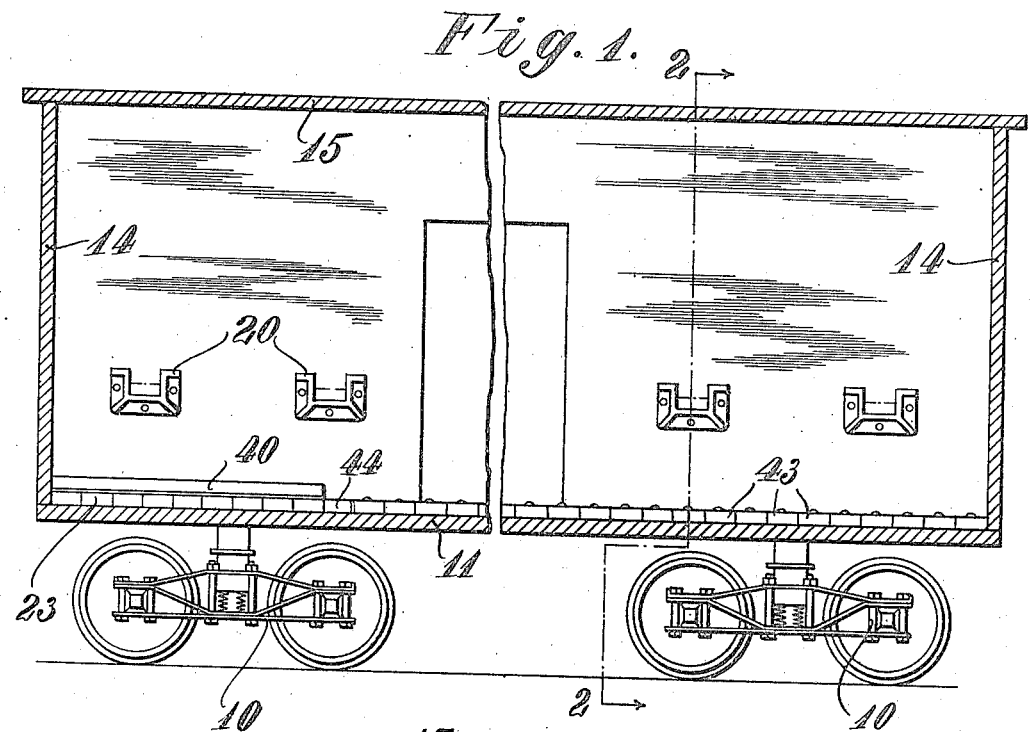
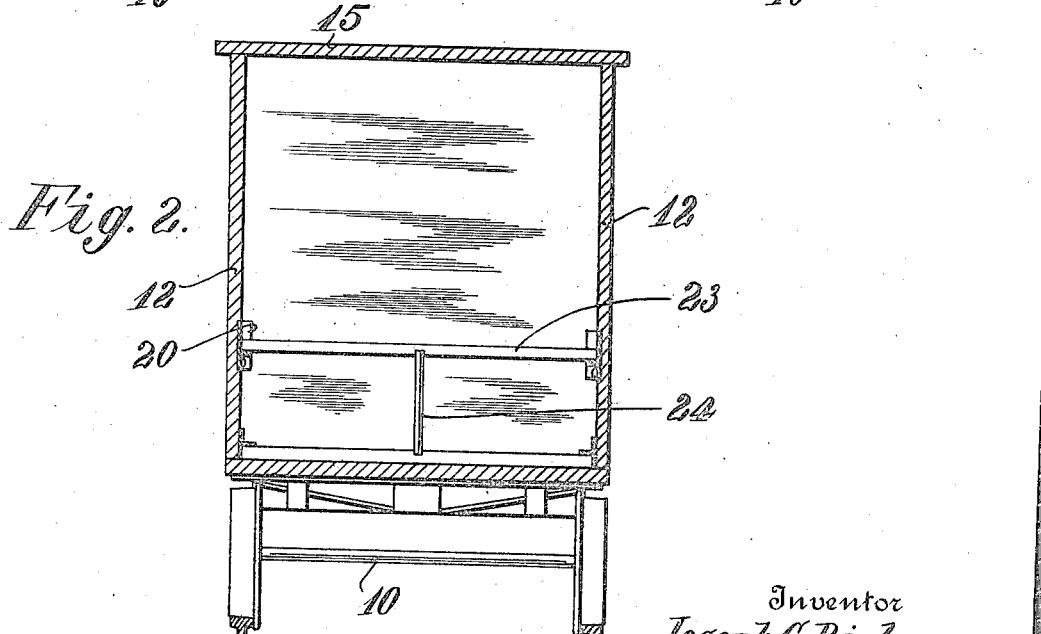
Inventor
Joseph C. Biela.
By his Attorney
Oscar Geier J. C. BIELA.
FREIGHT CAR CONSTRUCTION.
APPLICATION FILED FEB. 2, 1917.
1,238,874.
Patented Sept. 4, 1917.
2 SHEETS—SHEET 2.
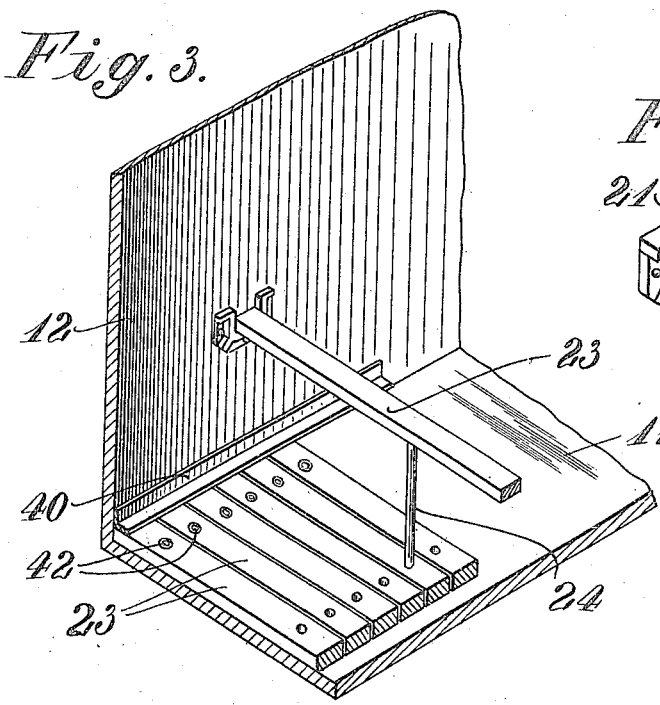
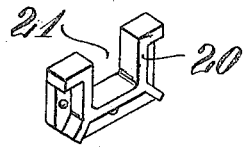
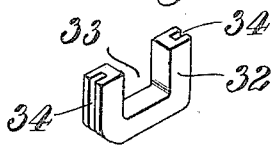
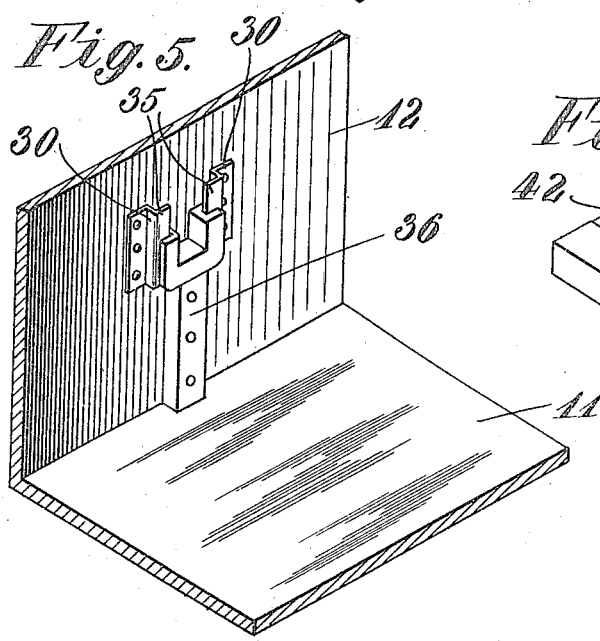
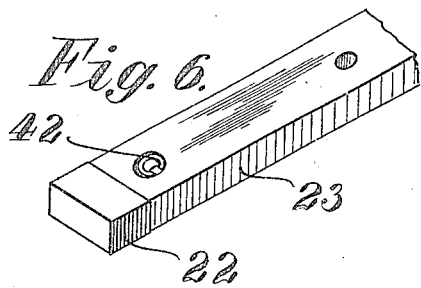
Inventor
Joseph C. Biela.
By his Attorney
Oscar Geier

UNITED STATES PATENT OFFICE.

JOSEPH C. BIELA, OF CHICAGO, ILLINOIS.

FREIGHT-CAR CONSTRUCTION.

1,238,874. Specification of Letters Patent. Patented Sept. 4, 1917.

Application filed February 2, 1917. Serial No. 146,195.

*To all whom it may concern:*

Be it known that I, JOSEPH C. BIELA, a subject of the Emperor of Austria, resident of Chicago, county of Cook, and State of Illinois, have invented certain new and useful Improvements in Freight-Car Construction, of which the following is a specification.

This invention relates to improvements in car construction, and particularly those ordinarily used for the conveying of freight but which may be converted into a condition to be used by passengers.

The principal object of the invention is to provide a car of the class described in which changes may be readily and rapidly made from one type to another so that the same may be used by horses or soldiers or for other purposes that may arise.

This and other like objects are attained by the novel construction and combination of parts hereafter described and shown in the accompanying drawings, forming a material part of this specification, and in which:—

Figure 1 is a vertical sectional view taken substantially on the center line of the car.

Fig. 2 is a transverse sectional view taken on line 2—2 of Fig. 1.

Fig. 3 is a perspective fragmental view showing the interior construction.

Fig. 4 is a perspective view showing one of the brackets.

Fig. 5 is a perspective view showing a modification of bracket application.

Fig. 6 is a fragmental perspective view of one of the transverse members, and

Fig. 7 is a perspective view showing the slip socket adapted to be used with the adaptation shown in Fig. 5.

In the drawings, a conventional type of box or freight car is shown mounted upon trucks 10 and consisting of a fixed permanent floor 11, sides 12 and ends 14, covered by a roof 15. In the preferred form a plurality of bracket elements 20 are secured at regular intervals to the interior side walls of the car, the brackets having a central recess 21 adapted to receive the iron clad ends 22 of transverse members 23 which may be used as seats when it is desired to use the car in transporting passengers.

In the form of bracket shown in Figs. 5 and 7, a pair of Z shaped irons 30 are secured in oppositely disposed positions and adapted to receive a movable bracket 32 having a central recess 33 and further provided with vertical slots 34 at its sides adapted to engage with the extending elements 35 of the angles 30, the bracket being supported by means of a removable post 36 disposed directly between them and the surface 11 of the car floor.

The invention further comprises a pair of oppositely disposed fixed angles 40 secured to the car side along its lower edges and adapted to retain in position a plurality of auxiliary removable floor elements 23 each of which is provided with rings 42 by which they may be manipulated or removed so that the auxiliary floor can be used for the seat elements when desired.

A portion only of the floor is thus made, the remaining floor elements 43 being firmly nailed in position, one element 44 extending between the fixed or stationary auxiliary floor elements and thus normally held in position by means of the angles 40.

The operation of the invention will be clearly understood from the foregoing, as it is evident that certain sections of the auxiliary floor may be instantly removed, pressed in the brackets, and slid into position under the angles 40, so that the upper surfaces form part of the floor.

Having thus described my invention, what I claim as new, and desire to secure by Letters Patent, is:—

1. A composite car comprising a plurality of brackets rigidly engaged at spaced intervals to the side of the car, a plurality of transverse elements normally forming part of an auxiliary car floor, means for holding said transverse elements in position on the permanent floor, and means by which said elements may be manipulated.

2. A composite car comprised of the sides and floor and an auxiliary floor thereof, sections of said auxiliary floor being removable, brackets secured to the interior of the side walls, members slidably engaged in said brackets, means for supporting said members, and means formed in said brackets receptive of certain of said removable floor elements.

3. In a composite car, the combination with a floor and the sides thereof, brackets rigidly secured at spaced intervals to the interior walls of said sides, an auxiliary floor having a removable section, said section being comprised of separate elements, means for holding said elements normally in connection with the permanent floor of said car, said elements being receptive of said brackets, and means for manipulating said removable floor elements.

In testimony whereof I have affixed my signature this 13th day of January, 1917.

JOSEPH C. BIELA.